United States Patent [19]
Weston

[11] Patent Number: 4,536,212
[45] Date of Patent: * Aug. 20, 1985

[54] PRODUCTION OF A PURIFIED ALUMINUM MONOCHLORIDE FROM ALUMINA, BAUXITES AND CLAYS AND THE SUBSEQUENT PRODUCTION OF ALUMINUM METAL

[76] Inventor: David Weston, 34 Parkwood Ave., Toronto, Canada, M4V 2X1

[*] Notice: The portion of the term of this patent subsequent to Mar. 20, 2001 has been disclaimed.

[21] Appl. No.: 523,873

[22] Filed: Aug. 17, 1983

Related U.S. Application Data

[63] Continuation-in-part of Ser. No. 426,971, Sep. 29, 1982, Pat. No. 4,437,887.

[51] Int. Cl.³ .............................................. C22B 21/02
[52] U.S. Cl. ................................................... 75/68 B
[58] Field of Search ........................................ 75/68 B

[56] References Cited

U.S. PATENT DOCUMENTS

| | | | |
|---|---|---|---|
| 3,704,113 | 11/1972 | Hildreth | 75/1 |
| 3,793,003 | 2/1974 | Othmer | 75/68 |
| 3,842,163 | 10/1974 | Russell et al. | 423/496 |
| 3,853,541 | 12/1974 | Othmer | 75/68 B |
| 3,856,508 | 12/1974 | Othmer | 75/29 |
| 4,277,446 | 7/1981 | Weston | 423/136 |
| 4,437,887 | 3/1984 | Weston | 75/68 B |

FOREIGN PATENT DOCUMENTS 569830  2/1959  Canada .

*Primary Examiner*—Melvyn J. Andrews
*Attorney, Agent, or Firm*—Wenderoth, Lind & Ponack

[57] ABSTRACT

In the production of aluminum monochloride from alumina, bauxites, bauxitic clays and clays wherein the produced aluminum monochloride gas stream contains at least $CO_2$ and $Cl_2$ radical and this gas stream is initially passed through at least one bed of reducing agent selected from the group consisting of charcoal and devolatilized coke to convert the $CO_2$ to CO; subsequently the gas stream now containing at least AlCl, CO and $Cl_2$ radical is contacted with molten aluminum metal to convert the $Cl_2$ radical to AlCl to produce a gas stream of which the major components are AlCl and CO substantially free of $CO_2$ and $Cl_2$ radical.

12 Claims, 2 Drawing Figures

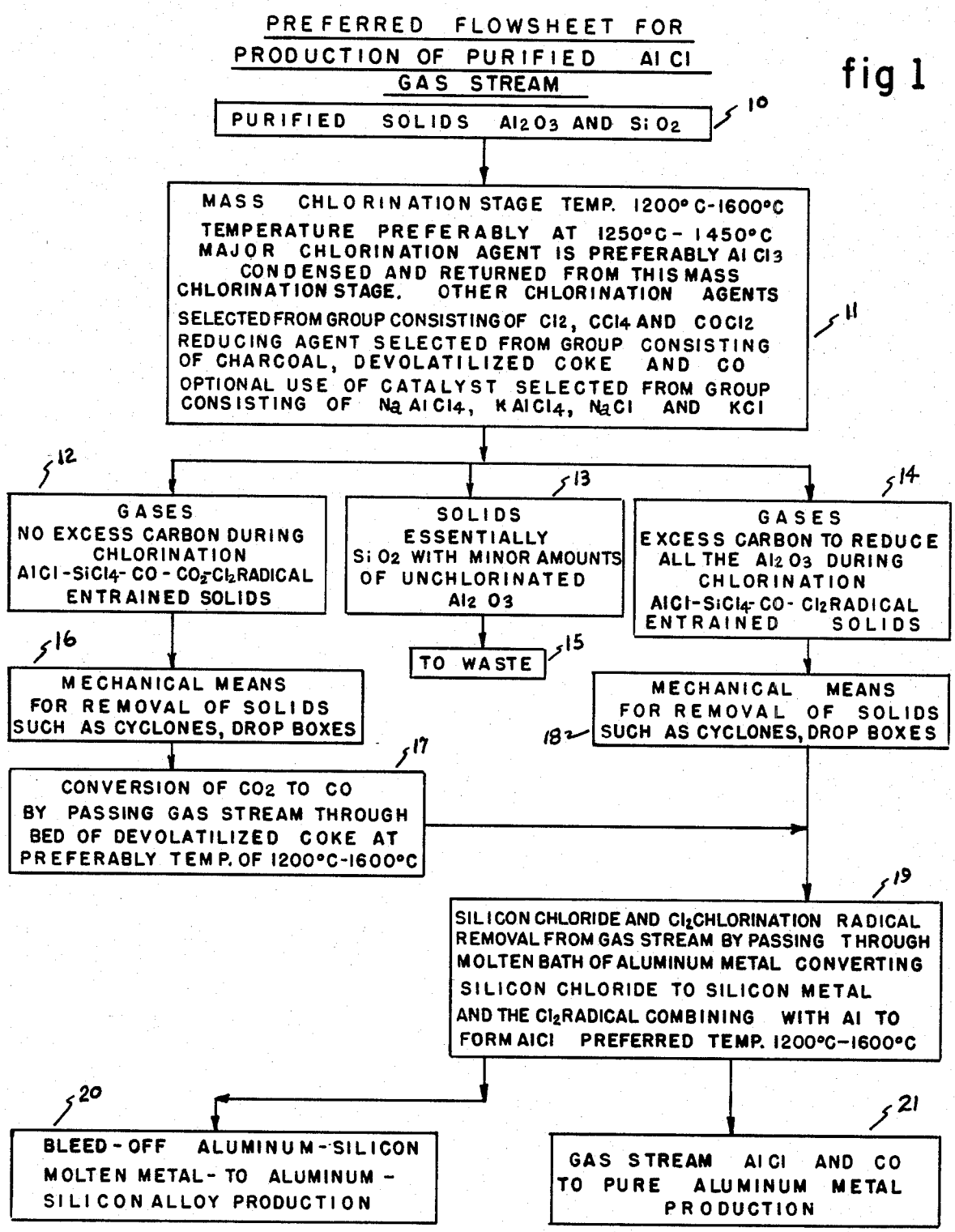

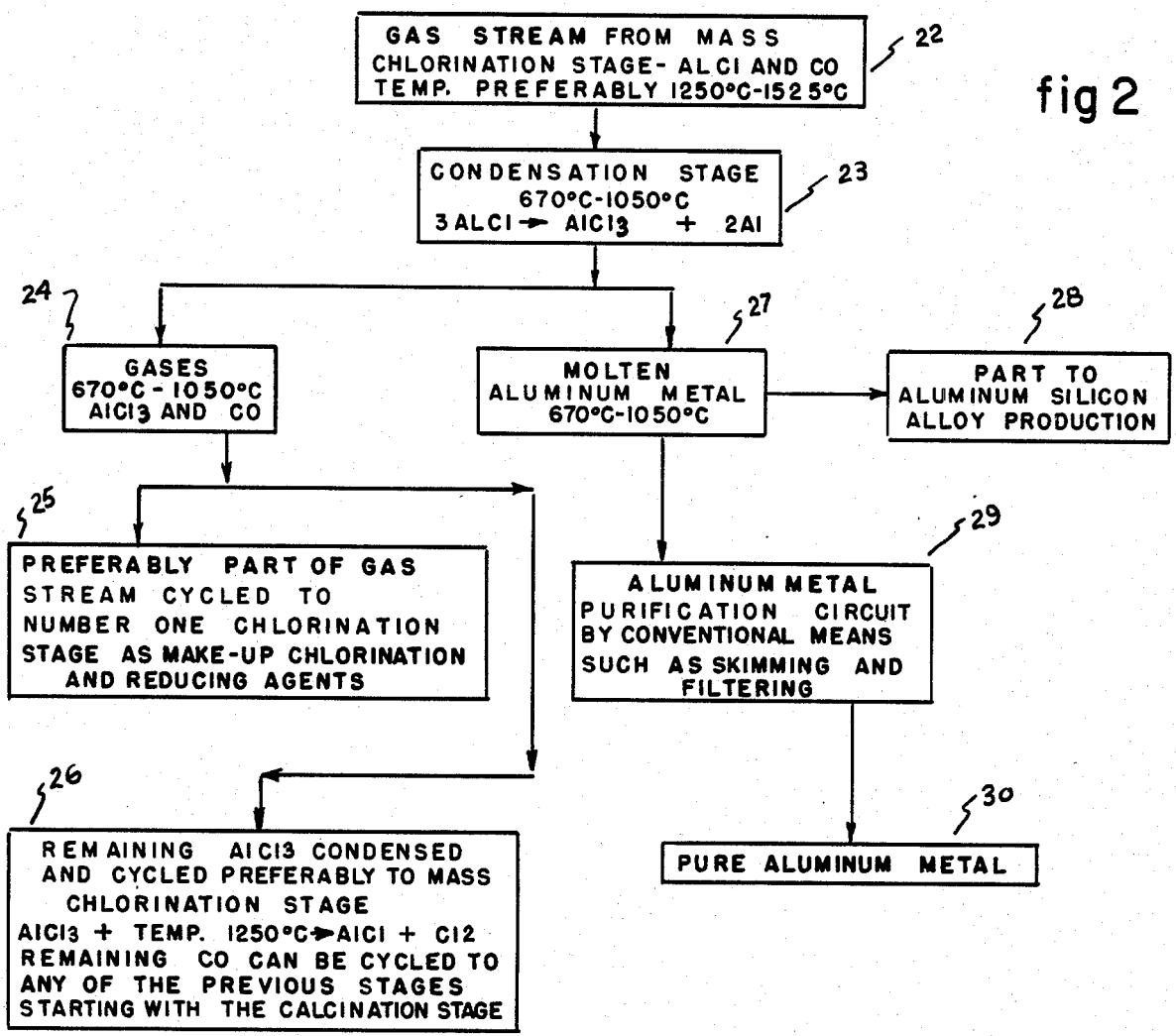

PRODUCTION OF A PURIFIED ALUMINUM MONOCHLORIDE FROM ALUMINA, BAUXITES AND CLAYS AND THE SUBSEQUENT PRODUCTION OF ALUMINUM METAL

CROSS-REFERENCE TO RELATED APPLICATION

This is a continuation-in-part of application Ser. No. 426,971, filed Sept. 29, 1982 (now U.S. Pat. No. 4,437,887).

BACKGROUND OF THE INVENTION

The invention is primarily applicable to materials such as bauxites, clays and mixtures thereof that have present as major impurities iron and titanium in various mineral forms.

There has been a great deal of research and there is a vast quantity of literature in attempts to produce a relatively iron-free aluminum chloride from such raw materials as bauxites and clays. None of the processes proposed have been shown to be economically successful.

This problem can best be described by the following references:

Landsberg "Chlorination Kinetics of Aluminum Bearing Minerals: Metallurgical Transactions B, Volume 6B, June 1975; pages 207–208."

"Whereas Foley and Tittle showed that iron could be removed from pre-reduced bauxite by chlorination to produce a refractory grade alumina, FIG. 2 indicates that a substantial loss of alumina accompanies the initial rapid iron chlorination under reducing conditions. Even if this loss could be tolerated the remaining iron is too high for producing cell grade alumina or aluminum chloride."

U.S. Pat. No. 3,842,163, A. S. Russell et al., entitled "Production of Aluminum Chloride" and assignors to Aluminum Company of America, state, to quote lines 45 to 58:

"In general, the reduction of aluminum-containing materials with chlorine in the presence of reducing carbon in some form to produce aluminum chloride is an old and generally well-known reaction and one of the suggested expedients referred to above utilized Bauxite as the alumina containing material. Bauxite however, normally contains many impurities including iron oxide, silica, and titania. Since these impurities readily react with chlorine in the presence of carbon to form iron, silicon, and titanium chlorides, the usual gaseous aluminum chloride reaction effluent therefrom must be subjected to cumbersome and expensive after-purification measures if these chloride contaminants are to be separated to provide even a reasonably pure aluminum product."

The U.S. Department of the Interior, Information Circular 1412 by Robert L. de Beauchamp, sums up the problem of producing $AlCl_3$ from various materials on page 6, the last paragraph reading as follows:

"The raw materials that may be used for the preparation of $AlCl_3$, include bauxite, clays, shale, anorthosite, coal ash, and many other aluminum containing materials. Bauxite or clays are the most logical choices because of their higher $Al_2O_3$ contents and the large reserves of these materials available. Iron is the impurity most deleterious to the process since it uses up chlorine and is difficult to remove from the product."

Canadian Pat. No. 569,830 to Groth in 1939 described a method for chlorinating aluminiferous materials by treating dehydrated and crushed raw materials with aluminum chloride vapor at 600° C.–900° C., removing hot reaction gases containing iron chloride and titanium chloride, treating the residue with chlorine and a reducing agent, and processing the recovered aluminum chloride vapor containing silicon chloride and carbon monoxide at temperatures above 800° C. with alumina or aluminiferous materials free from iron and titanium. The gases recovered from the chlorination process are oxidized to convert at least the chlorides of iron and titanium to their oxides prior to condensation. Therefore, because of the oxidation step, chlorides of the materials are not recovered in reusable form. Further, the vapor mixture recovered cannot be diluted with CO in order that the oxidation stage can be carried out.

Groth, Column 1, lines 28 to 32 states:

"It is true that when processing between 900° C.–1150° C. titanium is removed from the original material along with the iron in the form of titanium tetrachloride, but only in small amounts unless a large excess of aluminum chloride is used."

Weston, U.S. Pat. No. 4,277,446, in the first chlorination stage, depends upon the use of excess aluminum chloride containing $FeCl_3$ that is recovered from the circuit and returned to chlorinate the $Fe_2O_3$. To quote, Column 8, lines 30–34:

"(b) Excess $AlCl_3$ that is used is recovered at a low cost as an impure $AlCl_3$ containing $FeCl_3$ and returned to the Number One Chlorination Stage without any deleterious effects on chlorinating the contained iron and titanium minerals."

SUMMARY OF THE INVENTION

It is accordingly a primary object of the present invention to provide a novel and low cost process for the production of aluminum metal and aluminum-silicon alloys substantially free of iron, titanium, and trace impurities that normally occur in economically applicable raw materials, such as bauxites, bauxitic clays, clays and mixtures thereof.

A further object of the present invention is to provide a novel and low cost process for the production of substantially pure aluminum metal from bauxites, bauxitic clays, and clays wherein the iron and titanium and trace impurities have previously been removed from the raw materials prior to the mass chlorination stage to produce aluminum monochloride. The aluminum monochloride, AlCl, is a necessary production step for the subsequent production of pure aluminum metal.

A still further object of the present invention is to provide a novel and low cost process for the production of aluminum metal from substantially pure alumina such as produced from the Bayer-Hall process.

Preferred steps in the process are:

(a) Calcining the feed material to remove free and chemically combined water, and where such minerals as Kaolinite are present to break the chemical bond of $Al_2O_3$, $SiO_2$, and $H_2O$, driving off the $H_2O$ as water vapor and forming amorphous $Al_2O_3$ and amorphous $SiO_2$, which products respond differentially to chlorination treatment.

(b) At least one first Chlorination Stage in which at least one chlorination agent is selected from the group consisting of $Cl_2$, $COCl_2$, $CCl_4$, HCl, $SiCl_4$, $AlCl_3$ and AlCl, and preferably in the presence of reducing agent selected from the group consisting of C, CO and CH and in the temperature range of about 750° C. to 1600° C. to differentially chlorinate at least the iron. Where substantially pure alumina is the feed material to the process this stage and the stage described at (c) are omitted.

(c) Following the at least one first Chlorination Stage, I prefer to subsequently raise the temperature of the residual solids containing the purified $Al_2O_3$ - $SiO_2$ mixture to a temperature within the temperature range of about 1150° C. to about 1600° C. and preferably about 1200° C. to 1500° C. to remove non-volatile chlorides that may have formed at the lower temperature possibly used in the at least prior One Chlorination Stage. This is an optional stage in the process.

(d) At least a mass Chlorination Stage that involves mass chlorination of the $Al_2O_3$ contained in the feed material, initially preferably using chlorine, $CCl_4$ or $COCl_2$ in combination with a reducing agent preferably selected from the group consisting of carbon and carbon monoxide.

Following the initial mass chlorination of the $Al_2O_3$ I subsequently produce $AlCl_3$ which I prefer to return either in toto or in part to this mass Chlorination Stage as at least part of the chlorinating agent.

Alternately I may use $AlCl_3$ as the total chlorinating agent to this mass Chlorination Stage and preferably at least $AlCl_3$ in combination with chlorination agent selected from the group consisting of $Cl_2$, $COCl_2$ and $CCl_4$.

Further, if the $AlCl_3$ produced in a subsequent treatment stage can be more economically disposed of by such means as a commercial product my chlorinating agent may be preferably selected from the group consisting of $Cl_2$, $COCl_2$ and $CCl_4$. The method of carrying out this mass Chlorination Stage is under reducing conditions.

The preferred temperature range in this stage is about 1200° C. to about 1500° C. In this temperature range aluminum monochloride is formed which in subsequent treatment forms the base for production of pure aluminum metal.

(e) The gas stream produced by the chlorination stage described at (d) will contain major amounts of AlCl and $CO_2$, and minor amounts of $Cl_2$ radical residual from the chlorination agent, with minor amounts of silicon chloride when treating such materials as bauxites and clays. The gas stream is passed through at least one bed of reducing agent selected from the group consisting of charcoal and devolatilized coke in the preferred temperature range of about 1200° C. to 1600° C. to convert the $CO_2$ to CO.

(f) The gas stream following the reducing agent treatment in (e) contains major quantities of AlCl and CO, and minor quantities of $Cl_2$ radical and possibly silicon chloride. It may also contain the $Cl_2$ radical as complex carbon chlorides such as $CCl_4$.

This gas stream is passed through a molten aluminum bath in the temperature range of preferably about 1200° C. to 1600° C. wherein the $Cl_2$ radical is converted to AlCl; and silicon chloride, if present, is converted to silicon metal and AlCl, producing a gas stream containing AlCl and CO substantially free of $Cl_2$ radical, $CO_2$, iron and silicon chloride. Further, with such complex carbon chlorides present as $CCl_4$, the $CCl_4$ may react with the aluminum metal to produce AlCl, leaving carbon behind in the molten aluminum bath. In a subsequent purification stage this residual carbon can be filtered out using conventionally known means.

(g) The gas stream produced in (f) is subjected to a condensation stage preferably in the temperature range of about 670° C. to 1050° C. to produce aluminum metal in the molten state, or alternately below 660° C. to produce aluminum metal in the solid form.

The following will define for clarity various terms used in describing the invention:

Calcination—also known as dehydration—this terminology as used in this application means the following:

(a) Removal of any free moisture as steam.

(b) Breaking down of the bond of water of crystallization in aluminum oxide minerals which have the chemical analysis of $Al_2O_3xH_2O$, wherein a high percentage of water of crystallization is driven off as steam.

(c) Breaking down of the chemical bond or bonds of complex aluminum minerals such as Kaolinite, $Al_2O_3 \cdot 2SiO_2 2H_2O$, wherein the $H_2O$ is driven off as steam and the $Al_2O_3$ and $SiO_2$ are converted into amorphous $Al_2O_3$ and amorphous $SiO_2$ respectively. To accomplish satisfactory calcination of bauxites and clays, a temperature range of 625° C. to about 1500° C. may be used. It will be appreciated that the effectiveness of the calcination step is primarily a function of temperature and time, the economic optimum being readily determined by anyone skilled in the art.

This stage of the process uses conventional equipment well known in the art, and consists of such equipment as horizontal rotary kilns, vertical shaft furnaces, and fluo-solids reactors with their auxiliary gas scrubbers and dust collection units.

Clays—generally refer to materials containing little or no $Al_2O_3.xH_2O$ minerals and the major aluminum mineral component is essentially Kaolinite.

Iron and Titanium—the standard practice of the aluminum industry is to report Fe and Ti analyses as $Fe_2O_3$ and $TiO_2$. The iron and titanium minerals contained in the aluminum bearing materials vary considerably and are but rarely only in the form of $Fe_2O_3$ and $TiO_2$. For instance the major iron mineral in Arkansas bauxite is siderite, $FeCO_3$, and the commonest occurring form of titanium is as ilmenite, $FeOTiO_2$. When I refer to percentages of $Fe_2O_3$ and $TiO_2$ herein, I mean the chemical analyses of Fe and Ti converted to $Fe_2O_3$ and $TiO_2$ respectively.

Carbon—any form of carbon that can be used in specific stages of the process of the invention as a reducing agent for the contained metallic oxides in the raw material used in the process herein described, and that will not introduce added impurities that may have a major detrimental effect on the final desired product. Examples of such carbon are charcoal, devolatilized coal coke and devolatilized petroleum coke. The type of coke used should be carefully selected to avoid introducing comparatively large quantities of impurities that may have a major detrimental effect in the process to produce pure aluminum monochloride.

Devolatilization—refers to solid fuels such as coal or petroleum coke wherein the specific material has been heated to a sufficiently high temperature to drive off substantially all of the contained water as water vapor and any free hydrogen contained in the raw material.

Neutral conditions—where there is just sufficient free oxygen to meet the needs of the reaction.

$Cl_2$ radical—in terms of this application means free $Cl_2$, chlorine combined in such carbon complexes as $CCl_4$ or mixtures thereof and $COCl_2$.

Oxidizing condition—where there is an excess of free oxygen to meet the needs of the reaction and free oxygen present at the end of the particular stage.

Reducing conditions—where there is an excess of CO, H$_2$, or CH radical present to meet the needs of the reaction.

Neutral to reducing conditions - where there is no free oxygen, CO, H$_2$ or CH radical present in the gas stream to conditions where CO, H$_2$ or CH radical is present in the gas stream.

Starvation or minor amounts of chlorination agent—this descriptive phrase, in the context of this application, basically refers to small amounts of chlorination agent that is added to the circuit as either supplementary to a major chlorination agent or alternately by itself to normally chlorinate the impurities that occur in bauxites and clays with the exception of silica.

Aluminum trichloride—AlCl$_3$ or Al$_2$Cl$_6$ or mixtures thereof.

Aluminum monochloride—AlCl
Aluminum chloride—AlCl$_3$, Al$_2$Cl$_6$ & AlCl
Silicon tetrachloride—SiCl$_4$
Silicon dichloride—SiCl$_2$
Silicon chloride—SiCl$_4$ and SiCl$_2$
Silica—SiO$_2$
Alumina—Al$_2$O$_3$

BRIEF DESCRIPTION OF THE DRAWINGS

Reference is now made to the drawings accompanying the application where it will be seen that FIG. 1 shows a preferred flowsheet of the invention for the production of a purified AlCl gas stream containing major amounts of AlCl and CO and substantially free of CO$_2$, silicon chloride, and Cl$_2$ radical.

FIG. 2 shows a preferred flowsheet of the invention treating the gaseous product produced by FIG. 1 to produce aluminum metal and aluminum silicon alloy metal.

DETAILED DESCRIPTION OF THE DRAWINGS

In FIGS. 1 and 2 the equipment used for handling of the solids is conventional such as fluo-solids reactors, horizontal rotary kilns, and shaft furnaces and for this reason is not shown in the drawings. Similarly the handling of the gases and the controlled temperature condensation, or condensation and fractional distillation to obtain separation of the various products is well known in such industries as the production of titanium oxide pigment from rutile or ilmenite using the chlorination process, and as such the equipment is not shown.

Similarly in FIG. 2 the maintaining of the molten bath of aluminum metal at controlled temperatures is well known in the art and as such the equipment is not shown.

FIG. 1—The solids shown at 10, produced by pretreatment stages described herein or the Bayer process are substantially pure alumina, or Al$_2$O$_3$ and SiO$_2$ substantially free of iron and other impurities.

The chlorination agents used in the mass Chlorination Stage as shown at 11 are preferably selected from the group consisting of AlCl$_3$, Cl$_2$, COCl$_2$ and CCl$_4$. The reducing agents used are preferably selected from the group consisting of charcoal, devolatilized coke and CO.

The temperature range is about 1200° C. to about 1600° C.

AlCl$_3$ when raised to this temperature range breaks down as follows:

AlCl$_3$+temp. 1200° C. to 1600° C.→AlCl+Cl$_2$ Chlorine and excess carbon react with the contained Al$_2$O$_3$ as follows:

$$2Al_2O_3 + 3C + 2Cl_2 \rightarrow 4AlCl + 3 CO_2$$

In using closely controlled amounts of chlorine radical the solids product shown at 13 discharging from this stage will be essentially SiO$_2$ with minor amounts of unchlorinated Al$_2$O$_3$. This product will normally be waste as shown at 15.

The gas stream shown at 12 in which the chlorination stage used little or no excess carbon to reduce all of the contained Al$_2$O$_3$, the components of the gas stream will contain major amounts of AlCl and CO$_2$ with minor trace amounts of silicon chloride, CO and Cl$_2$ radical together with entrained solids of Al$_2$O$_3$ and SiO$_2$.

As shown at 16 I prefer to remove the bulk of the entrained solids by mechanical means such as cyclones and drop boxes well known in the art.

As shown at 17 the gas stream is passed through a carbon bed, preferably devolatilized coke or charcoal in the temperature range of about 1200° C. to about 1600° C. to convert substantially all of the contained CO$_2$ in the gas stream to CO. The chemical reaction is as follows:

$$CO_2 + C \rightarrow 2CO$$

This is an important step in the process as CO$_2$ present during the formation of aluminum metal as shown in FIG. 2 at 23 may cause oxidation of the aluminum metal by giving up one of its oxygens.

As shown at 19 the gas stream is passed through a molten bath of aluminum metal preferably in the temperature range of about 1200° C.–1600° C. Any contained silicon chloride in the gas stream reacts as follows:

$$4Al + SiCl_4 \rightarrow 4AlCl + Si.$$

The silicon thus produced will remain in the aluminum metal bath and is tapped off together with aluminum metal to produce aluminum-silicon alloy.

The minor amount of free chlorine that may be present in the gas stream reacts as follows:

$$2Al + Cl_2 \rightarrow 2AlCl.$$

Thus the gas stream discharging from the molten aluminum bath as shown at 21 will be substantially AlCl and CO, substantially free of CO$_2$, Cl$_2$ radicals, iron and silicon.

At 14 the gas stream produced by the mass Chlorination Stage shown at 11 using excess carbon to reduce all of the contained Al$_2$O$_3$ will contain major amounts of AlCl and CO with minor to trace amounts of silicon chloride and Cl$_2$ radical together with entrained solids. It may also contain minor amounts of CO$_2$.

In treating the gas stream shown at 14 I prefer to remove the bulk of the contained solids by mechanical means shown at 18.

As in the treatment of the gas stream shown at 12 the preferred step in this chlorination stage prior to the production of aluminum metal is the removal of any contained silicon chloride or Cl$_2$ radical by passing the gas stream through a molten aluminum metal bath shown at 21.

FIG. 2—As shown at 22 the feed stock to the pure aluminum metal production stage is substantially AlCl and CO.

The temperature of the gas stream as shown at 21 is preferably in the temperature range of about 1250° C. to 1525° C.

This gas stream is fed into the aluminum metal condensation unit as shown at 23 wherein the temperature is reduced to within the temperature range of 670° C. to about 1050° C. With this temperature drop the following reaction takes place:

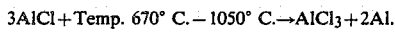

$$3AlCl + \text{Temp. } 670° C. - 1050° C. \rightarrow AlCl_3 + 2Al.$$

As will be seen from this reaction, two-thirds of the aluminum contained in the AlCl is recovered as aluminum metal. If desired with all of the AlCl$_3$ produced cycled to the chlorination stage shown at 11, as the circuits come into metallurgical balance all of the contained aluminum in the produced AlCl as shown at 12 or 14 will be recovered as an aluminum-silicon alloy as shown at 19 and pure aluminum metal as shown at 30.

Following the condensation stage shown at 23, the gas stream will contain substantially pure AlCl$_3$ and CO as shown at 24.

The AlCl$_3$ is preferably condensed (not shown) at a temperature lower than 183° C.

All of the AlCl$_3$ can be cycled to the previously described first Chlorination Stage shown at 10 or alternately used in various required amounts in one or more prior chlorination stages as described in the examples. The CO component of the gas stream, in addition to a portion that may be cycled to the first Chlorination Stage to produce the product shown at 10 can be cycled to any of the preceding stages including the calcination stage.

As shown at 27 the aluminum metal produced is in a molten state in the temperature range of 670° C. to about 1050° C., and in the solid form below 660° C.

A portion of the molten aluminum metal formed in the condensation stage 23 may be cycled to the molten aluminum bath 19 to replace the aluminum-silicon molten metal bleed-off in those cases where the purified solids material 10 contains SiO$_2$ and where the gas stream passing into the molten bath of aluminum 19 contains Cl$_2$ radical thus forming AlCl. This is shown at 28.

As shown at 29, small quantities of entrained solids such as Al$_2$O$_3$, SiO$_2$, and carbon can be removed by conventional means well known to the art such as skimming and filtering to produce a purified aluminum metal as shown at 30.

EXAMPLES OF THE INVENTION IN REMOVING IRON AND OTHER IMPURITIES FROM BAUXITES AND CLAYS PRIOR TO THE MASS CHLORINATION OF THE CONTAINED ALUMINA

In the following examples to produce an alumina-silica product substantially free of iron, and subsequently aluminum chloride substantially free of iron, and finally aluminum metal from the aluminum chloride substantially free of iron EXAMPLES 1, 2 and 3, illustrate three different methods to finally produce aluminum metal substantially iron free.

In EXAMPLE 1 the first Chlorination Stage is conducted as a two stage differential chlorination using SiCl$_4$ in the first stage and AlCl$_3$ in the second stage to differentially chlorinate the iron and titanium.

In EXAMPLE 2 the first Chlorination Stage is conducted as a single stage differential chlorination using at least one chlorination agent selected from the group consisting of HCl, Cl$_2$, COCl$_2$ and CCl$_4$, and at least one chlorination agent selected from the group consistiong of AlCl$_3$, AlCl, and SiCl$_4$, to differentially chlorinate at least the iron.

In EXAMPLE 3, the first Chlorination Stage is conducted as a single stage differential chlorination using at least one chlorination agent selected from the group consisting of Cl$_2$, HCl, COCl$_2$, CCl$_4$, AlCl$_3$, AlCl, SiCl$_4$ to differentially chlorinate at least the iron.

The following examples of the invention were carried out on a bulk sample of Kaolinitic Clay from a deposit located in the southeastern United States of America.

The sample as received was magnetically cobbed in a Colburne laboratory high intensity magnetic laboratory unit, dried to approximately 5% free moisture, crushed, put through rolls and screened at 10 mesh and 100 mesh to produce a product that was essentially minor 10 plus 100 U.S. Standard. This product was calcined at 700° C. to 750° C., and after calcination was the feed material to the following examples except where otherwise noted.

The chemical analysis of the calcined product was as follows:

| Al$_2$O$_3$ | SiO$_2$ | Fe$_2$O$_3$ | TiO$_2$ | L.O.I. |
|---|---|---|---|---|
| 44.0 | 51.5 | 1.27 | 2.77 | 0.3 |

All of the examples were carried out in a 2½ inch fluo-solids reactor using batch charges of 250 grams.

The total gas volume used in all tests was kept reasonably constant at 5.0 liters per minute calculated at 21.1° C., and adjusted to the 5.0 liters with CO.

EXAMPLE 1

The following were conditions of this example:
Temperature in stages one and two, 1010° C.
CO in both stages, adjusted to total gas volume of 5.0 liters/min.

| Stage 1 - SiCl$_4$ 0.7 gms/min. for 20 mins. |
|---|
| Stage 2 - AlCl$_3$ 4.9 gms/min. for 40 mins. |

The following results were obtained:

| Stage No. | Chemical Analysis Solids % by weight | | Gases % Distribution | |
|---|---|---|---|---|
| | Fe$_2$O$_3$ | TiO$_2$ | Fe$_2$O$_3$ | TiO$_2$ |
| 1 | 0.021 | 0.494 | 98.35 | 82.1 |
| 2 | 0.012 | 0.273 | 99.05 | 90.15 |

In Stage 1 the SiCl$_4$ formed only approximately 2.0% of the gas stream and differentially chlorinated 98.35% of the Fe$_2$O$_3$ and 82.1% of the TiO$_2$. All of the SiCl$_4$ could be chemically accounted for in the reactions with the Fe$_2$O$_3$ and TiO$_2$ resulting in no requirement for recirculation of any excess chlorination agent such as in the Weston, U.S. Pat. No. 4,277,446.

This was an amazing result in a twenty minute differential chlorination period.

The following are the chemical reactions involved:

$$2\,Fe_2O_3 + 3\,SiCl_4 \rightarrow 4\,FeCl_3 + 3\,SiO_2$$
$$TiO_2 + SiCl_4 \rightarrow TiCl_4 + SiO_2$$

In using appreciably higher concentrations of $SiCl_4$, the results could not be duplicated. There seems to be no logical explanation for this totally unexpected phenomenon.

The maximum concentration of $SiCl_4$ in the gas stream for optimum results is approximately 10%.

It will be noted that the chlorination gas stream in Stage 1 was reducing with an excess of CO present. This is my preferred condition in this differential iron chlorination stage. However, where I use one or more chloriation agents selected from the group consisting of $SiCl_4$, $AlCl_3$, $AlCl$, $Cl_2$, $CoCl_2$, $HCl$ and $CCl_4$ and the differential chlorination agent for iron I may use a gas stream that varies from neutral to reducing.

In Stage 2 of the process the final product shows 99.05% of the $Fe_2O_3$ and 90.25% of the $TiO_2$ differentially chlorinated.

Not only does this product meet unheard of $Fe_2O_3$ specifications for the highest grade refractory, but in addition, following mass chlorination of the contained $Al_2O_3$ and differential temperature condensation of the $AlCl_3$ would produce acceptably pure aluminum metal.

EXAMPLE 2

The following were conditions of this example:
Temperature in the Chlorination Stage, 913° C.

Agents Used: 1.5 gms/min. HCl and 1.0 gms/min. $SiCl_4$ and make-up of gas stream to approximately 5.0 liters/min. with CO.

Treatment time: 25 minutes

At the end of the 25 minute treatment of the solids feed the residual solids product analyzed 0.016% $Fe_2O_3$. This analysis shows that 98.7 of the $Fe_2O_3$ in the feed material was chlorinated to produce a substantially iron free alumina silica product.

This was an amazing result from the use of starvation quantities of HCl and $SiCl_4$ and the short duration of the differential chlorination treatment. The alumina-silica product is outstanding in the low iron content and subsequent production of substantially iron-free aluminum chloride product suitable for the production of aluminum metal.

EXAMPLE 3

The following were conditions of this example:
Temperature in the Chlorination Stage, 985° C.

Agents used: 1.06 gms/min. $Cl_2$ and make-up of gas stream to approximately 5.0 liters/min. with CO.

Treatment time: 20 minutes

At the end of the 20 minute treatment of the solids feed the residual solids product analyzed 0.022% $Fe_2O_3$. This analysis shows that 98.3% of the $Fe_2O_3$ in the feed material was chlorinated to produce a substantially iron free alumina silica product.

This was an outstanding result from the use of starvation quantities of $Cl_2$ and the short duration of the differential chlorination treatment. The alumina-silica product is outstanding in the low iron content and in the subsequent production of aluminum chloride, the aluminum chloride produced would be substantially iron free, and suitable for the production of aluminum metal.

EXAMPLE 4

In this example, using the same agglomerated and calcined feed material as in EXAMPLES 1, 2 and 3 and sized to produce a feed of minus 18 mesh plus 100 mesh, chlorination was carried out wherein in the first Chlorination Stage in excess of 99% of the contained $Fe_2O_3$ was differentially chlorinated, and in the mass Chlorination Stage approximately 90% of the contained $Al_2O_3$ in the calcined feed material was converted to aluminum chloride at a temperature of 1200° C. to 1210° C.

In the first differential iron chlorination stage 0.4 gms/min. of $Cl_2$ was added to the CO gas stream. The total gas stream was 4.5 liters/min. calculated at 21.1° C. The temperature was 1100° C. and the time period 30 mins.

The product from this first differential Chlorination Stage analyzed 0.006% $Fe_2O_3$ resulting in 99.5% of the original iron in the feed material being differentially chlorinated.

In the second mass Chlorination Stage of the contained $Al_2O_3$ the following conditions were used:
Temperature: 1200° C. to 1210° C.
Time: 90 mins.
$Cl_2$: first 60 mins. 4.67 gms/min. last 30 mins. 4.8 gms/min.
Charcoal: 25 gms. to original bed; at 60 mins. 20 gms, charcoal to bed.
$KalCl_4$ added as catalyst: 1.7 gms/min.; CO make-up gas stream to 5.0 liters/min. calculated at 21.1° C. 92% of the $Al_2O_3$ in the original calcined feed material was converted to aluminum chloride.

In using an agglomerated product I may choose to blend such feed materials to my process as Kaolinitic Clay or bauxitic clay with bauxites or Kaolinitic Clay or bauxitic clay with Bayer process alumina to control the $Al_2O_3$ content of the agglomerates produced.

The invention has been described herein with reference to certain preferred embodiments. However, as obvious variations thereon will become apparent to those skilled in the art, the invention is not considered to be limited thereto.

What I claim as my invention is:

1. The process steps for the production of aluminum metal from the group of materials consisting of alumina, bauxites, bauxitic clays, clays and mixtures thereof and said materials containing at least $Al_2O_3$ minerals in the group consisting of $Al_2O_3 x H_2O$ and $Al_2O_3 2SiO_2\, 2H_2O$ and said $Al_2O_3$ minerals containing chemically combined $H_2O$ comprising: subjecting the said materials to calcination in the temperature range of about 625° C. to 1500° C. to produce a calcined product substantially free of said chemically combined $H_2O$; subsequently subjecting the said calcined product to at least a mass chlorination stage in the presence of chlorination agent containing at least $Cl_2$ radical and selected from the group consisting of $Cl_2$, $COCl_2$, $CCl_4$ and $AlCl_3$ and reducing agent selected from the group consisting of C and CO and in the temperature range of about 1200° C. to 1600° C. to produce a gas stream wherein the said $Al_2O_3$ has been coverted to gaseous AlCl and said gas stream contains said AlCl, and at least $CO_2$ and $Cl_2$ radical; subsequently passing the said gas stream through at least one bed selected from the group consisting of charcoal and devolatilized coke and in the temperature range of about 1200° C. to 1600° C. to convert said $CO_2$ to CO to produce a first modified gas stream containing at least said AlCl and said CO; subsequently passing the said first modified gas stream through molten aluminum metal in the temperature range of about 1200° C. to 1600° C. to convert at least part of the said chlorination agent $Cl_2$ radical to AlCl to produce a second modified gas stream containing at least the said AlCl and CO; subsequently lowering the temperature of the said second modified gas stream to within the temperature range of about 670° C. to 1050° C. to produce molten aluminum metal and a third modified gas stream containing at least $AlCl_3$ and said CO.

2. The process of claim 1, wherein the said second modified gas stream containing AlCl and CO is lowered to below 660° C. to produce the said aluminum metal as a solid.

3. The process of claim 1, wherein the said mass chlorination stage is carried out in the presence of catalyst and said catalyst is selected from the group consisting of $NaAlCl_4$, $KAlCl_4$, NaCl and KCl.

4. The process of claim 1, wherein preceding the said calcination the said materials are prepared to produce particles in the range of about 10 to 100 mesh.

5. The process of claim 2, wherein at least part of the said third modified gas stream containing $AlCl_3$ and CO is cycled to said mass chlorination stage.

6. The process steps for the production of aluminum metal from the group of materials consisting of bauxites, bauxitic clays, clays, and mixtures thereof, and said materials containing at least iron minerals and at least $Al_2O_3$ minerals in the group consisting of $Al_2O_3xH_2O$ and $Al_2O_3.2SiO_2.2H_2O$ and said $Al_2O_3$ minerals containing chemically combined $H_2O$ comprising: subjecting the said materials to calcination in the temperature range of about 625° C. to 1500° C. to produce a calcined product substantially free of said chemically combined $H_2O$; subsequently subjecting the said calcined product to at least one first chlorination stage in the presence of chlorination agent selected from the group consisting of $Cl_2$, $COCl_2$, $CCl_4$, HCl, $AlCl_3$, AlCl ahd $SiCl_4$ and in a reducing to neutral first chlorination gas stream and in the temperature range of about 750° C. to 1500° C. to produce a solids $Al_2O_3$-$SiO_2$ product substantially free of said iron; subsequently subjecting the said $Al_2O_3$-$SiO_2$ product to at least a mass chlorination stage in the presence of chlorination agent selected from the group consisting of $Cl_2$, $COCl_2$, $CCl_4$ and $AlCl_3$ and reducing agent selected from the group consisting of C and CO and in the temperature range of about 1200° C. to 1600° C. to produce at least a second chlorination gas stream wherein the said $Al_2O_3$ has been converted to gaseous AlCl and said gas stream contains the said AlCl, and at least $CO_2$, $Cl_2$ radical and silicon chloride; subsequently passing the said gas stream through at least one bed selected from the group consisting of charcoal and devolatilized coke and in the temperature range of about 1200° C. to 1600° C. to convert said $CO_2$ to CO and to produce a first modified gas stream containing at least said AlCl, $Cl_2$ radical and silicon chloride and said CO; subsequently passing the said gas stream through molten aluminum metal in the temperature range of about 1200° C. to 1600° C. to convert at least part of the said chlorination agent $Cl_2$ radical to AlCl and said silicon chloride to silicon and AlCl to produce a second modified gas stream containing at least AlCl and CO and said silicon remaining in the said molten aluminum metal; subsequently lowering the temperature of the said second modified gas stream to within the temperature range of about 670° C. to about 1050° C. to produce molten aluminum metal and a third modified gas stream containing at least $AlCl_3$ and said CO.

7. The process of claim 6, wherein the said second modified gas stream containing AlCl and CO is lowered to below 660° C. to produce the said aluminum metal as a solid.

8. The process of claim 6, wherein the said mass chlorination stage is carried out in the presence of catalyst and said catalyst is selected from the group consisting of $NaAlCl_4$, $KAlCl_4$, NaCl and KCl.

9. The process of claim 6, wherein preceding the said calcination the said materials are prepared to produce particles in the range of about 10 mesh to 100 mesh.

10. The process of claim 6 wherein at least part of the said third modified gas stream containing $AlCl_3$ and CO is cycled to said mass chlorination stage.

11. The process of claim 6, wherein the said reducing to neutral first chlorination gas stream is reducing.

12. The process of claim 11, wherein the said reducing condition is brought about by the presence of excess CO.

* * * * *